United States Patent
He et al.

(10) Patent No.: US 12,126,402 B2
(45) Date of Patent: Oct. 22, 2024

(54) WIRELESS POWER AND DATA SYNCHRONOUS TRANSFER SYSTEM AND DATA MODULATION METHOD

(71) Applicant: ZHEJIANG UNIVERSITY, Hangzhou (CN)

(72) Inventors: Xiangning He, Hangzhou (CN); Sheng Liu, Hangzhou (CN); Yue Feng, Hangzhou (CN); Jiande Wu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 18/278,074

(22) PCT Filed: Jul. 22, 2022

(86) PCT No.: PCT/CN2022/107334
§ 371 (c)(1),
(2) Date: Aug. 21, 2023

(87) PCT Pub. No.: WO2023/193371
PCT Pub. Date: Oct. 12, 2023

(65) Prior Publication Data
US 2024/0048185 A1 Feb. 8, 2024

(30) Foreign Application Priority Data
Apr. 6, 2022 (CN) .......................... 202210354741.4

(51) Int. Cl.
*H04B 5/79* (2024.01)
*H02J 50/12* (2016.01)
*H04B 5/26* (2024.01)

(52) U.S. Cl.
CPC ................ *H04B 5/79* (2024.01); *H02J 50/12* (2016.02); *H04B 5/266* (2024.01)

(58) Field of Classification Search
CPC ............................... H02J 50/12; H04B 5/0037
See application file for complete search history.

(56) References Cited

U.S. PATENT DOCUMENTS

| | | | |
|---|---|---|---|
| 11,742,808 B1* | 8/2023 | Krishnamoorthy | H03F 3/245 330/10 |
| 2016/0181920 A1* | 6/2016 | Dai | H02M 1/14 323/271 |

(Continued)

FOREIGN PATENT DOCUMENTS

| | | |
|---|---|---|
| CN | 111901052 | 6/2020 |
| GB | 2585440 | 1/2021 |

OTHER PUBLICATIONS

Jiande Wu, et al, "Power Conversion and Signal Transmission Integration Method Based on Dual Modulatoin of DC-DC Converters", Feb. 2015, IEEE Transactions on Industrial Electronics, vol. 62, No. 2. pp. 1291-1300 (Year: 2015).*

*Primary Examiner* — Adi Amrany
(74) *Attorney, Agent, or Firm* — Jiwen Chen; Joywin IP Law PLLC

(57) ABSTRACT

Disclosed in the present invention are a wireless power and data synchronous transfer system and a data modulation method, wherein a power/information complex modulation is carried out on a primary side front converter and a secondary side back converter, and output power/information flow can be transmitted across the wireless power transfer circuit, thus realizing communication between the primary side and the secondary side. With the method of the present invention, by modulating a digital frequency band signal to a direct current bus, frequency mixing effect of an inverter/rectifier circuit is utilized to move a spectrum of modulated digital signal to a frequency near a power transfer frequency and then the modulated digital signal is transmitted to a circuit on the other side, and the circuit on the other (Continued)

side demodulates the signal to obtain a baseband signal. The present invention has wide applicability and can be used in various wireless power transfer systems, especially for high-frequency systems.

4 Claims, 6 Drawing Sheets

(56) References Cited

U.S. PATENT DOCUMENTS

| | | | |
|---|---|---|---|
| 2016/0241086 A1* | 8/2016 | Jung | H02J 50/12 |
| 2018/0062430 A1* | 3/2018 | Matsumoto | H02J 7/00 |
| 2020/0343765 A1* | 10/2020 | Kwon | H02J 50/12 |
| 2021/0281167 A1* | 9/2021 | Balaz | H02M 3/158 |
| 2023/0063671 A1* | 3/2023 | Song | H02J 50/80 |
| 2023/0104202 A1* | 4/2023 | O | H02J 7/00034 |
| | | | 320/108 |
| 2023/0261578 A1* | 8/2023 | Iwaki | H02M 3/155 |
| | | | 323/259 |

* cited by examiner

WIRELESS POWER AND DATA SYNCHRONOUS TRANSFER SYSTEM AND DATA MODULATION METHOD

This is a U.S. national stage application of PCT Application No. PCT/CN2022/107334 under 35 U.S.C. 371, filed Jul. 22, 2022 in Chinese, claiming priority of Chinese Application No. 202210354741.4, filed Apr. 6, 2022, all of which are hereby incorporated by reference.

FIELD OF TECHNOLOGY

The present invention belongs to the technical fields of power electronics, wireless power transfer and carrier communication, and in particular relates to a wireless power and data synchronous transfer system and a data modulation method.

BACKGROUND TECHNOLOGY

As a new type of power transfer, a wireless power transfer technology has been used more and more in many fields. The wireless power transfer comprises capacitively coupled power transfer and inductively coupled power transfer. The inductively coupled power transfer is divided into magnetic induction wireless power transfer and magnetic resonance wireless power transfer. At present, a magnetic induction wireless power transfer system has large output power and high transfer efficiency, but a signal frequency is low and a transfer distance is short. A magnetic resonance wireless power transfer system has a high signal frequency and a long transfer distance, but output power is small and transfer efficiency is low.

In a practical application, in addition to a need for an efficient power conversion circuit, the wireless power transfer system also needs to have functions such as feedback control, condition monitoring, coil positioning, and foreign object detection, so it is necessary to achieve one-way or two-way data communication between a power supply side (primary side) and a power receiving side (auxiliary side). A power coupling coil is used to realize communication between the primary side and the secondary side, which has the advantages of convenient installation and good safety. At present, there are mainly the following types of methods:

(1) The communication and the wireless power transmission use a common coupling coil, but the signal and energy are transmitted by time-division multiplexing. For example, a Chinese patent with a publication number CN102318136A adopts this method, which constantly switches a working mode, usually has a long transition process, affecting the transfer power and efficiency, so it is not suitable for high-power transfer, and a communication rate is also low.

(2) Communication and wireless power transfer share a coupling inductive coil and a common frequency band, using a load modulation method to transmit data from the secondary side to the primary side. A typical load modulation method comprises a communication mode adopted by a Qi standard, that is, adding an extra switch on the secondary side to realize reverse communication by switching load impedance; for example, a Chinese patent with a publication number CN106787244A uses a controlled rectifier circuit on the secondary side to achieve data transfer from the secondary side to the primary side by adjusting an opening angle, but this type of load modulation technology causes a large power loss and reduces energy transfer efficiency of the wireless energy transfer system, which is difficult to apply to high-power transfer occasions.

(3) Information and power transfer share a coupling coil, but the power and signal use different transfer frequencies. For example, a Chinese patent with a publication number CN103595145A proposes a method for realizing high-speed communication and wireless energy transfer based on common inductive coupling, but this method requires that a communication carrier frequency is much higher than a power transfer frequency, so it is suitable for low frequency wireless power transfer (such as 85 kHz). However, in some wireless power transmission systems using high frequencies (such as 6.78 MHz), this method is not suitable.

(4) In addition, a Chinese patent with a publication number CN113013999A proposes a method and circuit for realizing wireless power and data synchronous transfer through Direct Current (direct current) side series-modulated signals, but this method requires an extra set of signal coupling circuits.

A traditional wireless power transfer system comprises a primary side inverter circuit (including a compensation circuit), a primary side coil, a secondary side coil and a secondary side rectifier circuit (including a compensation circuit). However, in order to improve transfer efficiency of the wireless power transfer system, after the secondary side rectifier circuit converts power into direct current energy, an output end usually needs to go through a further one-stage converter to achieve high efficiency power transfer by adjusting impedance. In addition, in order to adjust output power, the primary side often uses an independent front converter to adjust an input voltage and power of the inverter circuit.

SUMMARY OF THE INVENTION

Aiming at application scenarios of high-frequency high-power wireless power transfer with a front/back conversion circuit, the present invention provides a wireless power and data synchronous transmission system and a data modulation method, which adopt a power/information complex modulation technology to carry out information modulation on a power pulse-width modulation signal inside a power electronic converter. Thus, a digital signal can be modulated directly to an input or output port of the converter without an extra signal modulation circuit, which has the advantages of a simple structure and high reliability.

A wireless power and data synchronous transfer system, comprising two parts of a primary side and a secondary side, wherein the primary side part comprises a Direct Current (direct current) power supply, a primary side front direct current/direct current conversion circuit $U_1$, a primary side back inverter circuit $U_2$ and a primary side coil $L_1$ which are sequentially connected; and the secondary side part comprises a secondary side coil $L_2$, a secondary side front rectifier circuit $U_3$, a secondary side back direct current/direct current conversion circuit $U_4$ and a load which are sequentially connected; the primary side part and the secondary side part are coupled by the primary side coil $L_1$ and the secondary side coil $L_2$ to realize wireless synchronous transfer of power and data;

when the primary side sends data to the secondary side, a data modulation method of the system is as follows: the primary side front direct current/direct current conversion circuit $U_1$ adopts a power and information complex modulation method to superpose a data signal to a direct current output end of $U_1$; after secondary modulation by the primary side back inverter circuit $U_2$, a main frequency band of the data signal is moved to a frequency near an operating frequency of wireless power transfer, and the data signal is transmitted to the secondary side through the primary side coil $L_1$ and the secondary side coil $L_2$ accompanied by a power carrier in the wireless power transfer so as to demodulate an output voltage ripple or an output current ripple of the secondary side front rectifier circuit $U_3$, and the data sent by the primary side can be received; and when the secondary side sends data to the primary side, a data modulation method of the system is as follows: the secondary side back direct current/direct current conversion circuit $U_4$ adopts the power and information complex modulation method to superpose a data signal to a direct current input end of $U_4$; after secondary modulation by the secondary side front rectifier circuit $U_3$, a main frequency band of the data signal is moved to a frequency near an operating frequency of wireless power transfer, and the data signal is transmitted to the primary side through the secondary side coil $L_2$ and the primary side coil $L_1$ so as to demodulate an output voltage ripple or an output current ripple of the primary side front direct current/direct current conversion circuit $U_1$, and the data sent by the secondary side can be received.

Further, the secondary modulation is a mixing modulation process using the primary side back inverter circuit $U_2$ or the secondary side front rectifier circuit $U_3$, that is, a high-frequency switching process of the primary side back inverter circuit $U_2$ or the secondary side front rectifier circuit $U_3$ is equivalent to a process of performing a square wave modulation of a low-frequency data signal on a direct current side, and moving the low-frequency data signal to a frequency near operating frequencies of the coils in a frequency domain.

Further, the power and information complex modulation method adopted by the primary side front direct current/direct current conversion circuit $U_1$ and the secondary side back direct current/direct current conversion circuit $U_4$ can be realized in the following two manners:

manner 1: a frequency and phase of a pulse-width modulation carrier are fixed, and the data signal after a baseband or frequency band modulation is superposed to a power control loop of $U_1$ or $U_4$; and manner 2: the data is modulated in a $U_1$ or $U_4$ pulse-width modulation carrier, and a carrier modulation method thereof can be frequency shift keying or phase shift keying.

Further, the data modulation method is suitable for an inductive coupled power transfer system and a capacitive coupled power transfer system; the inductive coupled power transfer system comprises a magnetic induction wireless power transfer system and a magnetic resonance wireless power transfer system; and the coil in the system can be of a single coil structure or a multi-coil structure.

Further, the primary side front direct current/direct current conversion circuit $U_1$ and the secondary side back direct current/direct current conversion circuit $U_4$ can adopt a circuit topological structure such as a Buck, a Boost, a Buck-Boost, an inductor-inductor-capacitor, a half-bridge, or a full-bridge.

Further, the primary side back inverter circuit $U_2$ can adopt a circuit topological structure such as a full-bridge inverter, a half-bridge inverter, or a Class-E inverter; and the secondary side front rectifier circuit $U_3$ can adopt a circuit topological structure such as a full-bridge rectifier, a half-bridge rectifier, or a Class-E rectifier.

Further, the data modulation method is suitable for a wireless power transfer system with an operating frequency from 1 kHz to 100 MHz.

Further, when the data modulation method is applied to a one-way communication system in which the primary side transmits data to the secondary side, the secondary side back direct current/direct current conversion circuit $U_4$ in the system can be cancelled.

Further, when the data modulation method is applied to a one-way communication system in which the secondary side transmits data to the primary side, the primary side front direct current/direct current conversion circuit $U_1$ in the system can be cancelled.

The synchronous transfer system of wireless energy information is an analog communication method based on a sinusoidal carrier. In traditional carrier modulation, a power component of a carrier greatly consumes energy of a receiver. In the present invention, the carrier has carrier power of wireless energy transfer, which can be used to drive the load, so the present invention not only does not consume power of a demodulation device, but also provides a carrier for information transfer. The inverter and rectifier in the system, as a square wave modulator, act as the analog signal modulator and demodulator in the process of information transfer, and give the power electronic switching device a new function of information modulation.

In addition, the present invention realizes the communication between the power supply side (primary side) and the power receiving side (secondary side) by utilizing the power/information complex modulation technology of the front/back conversion circuit. The primary side and secondary side communication comprise forward communication (the primary side sends data to the secondary side) and reverse communication (the secondary side sends data to the primary side).

Therefore, the system and method of the present invention can not only be used for the reverse communication, but also be used for the forward communication.

BRIEF DESCRIPTION OF THE DRAWINGS

FIG. 7($b$) is a schematic diagram of a principle of wireless information transfer based on the energy and data synchronous transfer system.

DETAILED DESCRIPTION OF THE EMBODIMENTS

In order to describe the present invention more specifically, the technical solution of the present invention is described in detail in combination with the accompany drawings and specific implementations.

Figure 1:
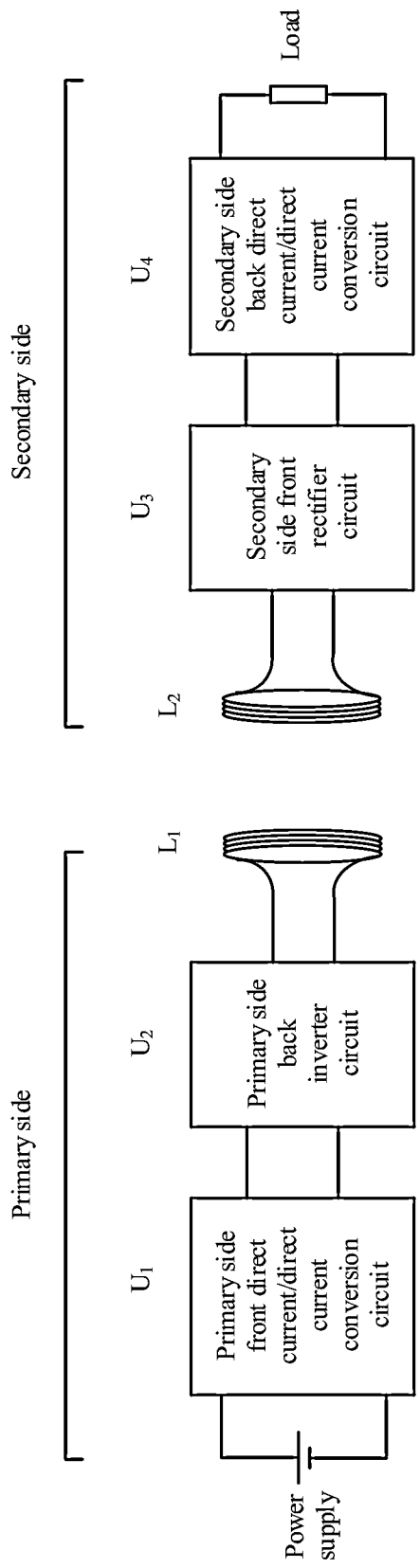
FIG. 1 is a structural schematic diagram of a wireless power transfer system having a front converter and a back converter.

As shown in FIG. 1, a wireless power and data synchronous transfer system of the present invention comprises two parts of a primary side and a secondary side, wherein the primary side part comprises a direct current power supply, a primary side front direct current/direct current conversion circuit $U_1$, a primary side back inverter circuit $U_2$ (including a compensation circuit) and a primary side coil $L_1$; and the secondary side part comprises a secondary side coil $L_2$, a secondary side front rectifier circuit $U_3$ (including a compensation circuit), a secondary side back direct current/direct current conversion circuit $U_4$ and a load.

Figure 2:
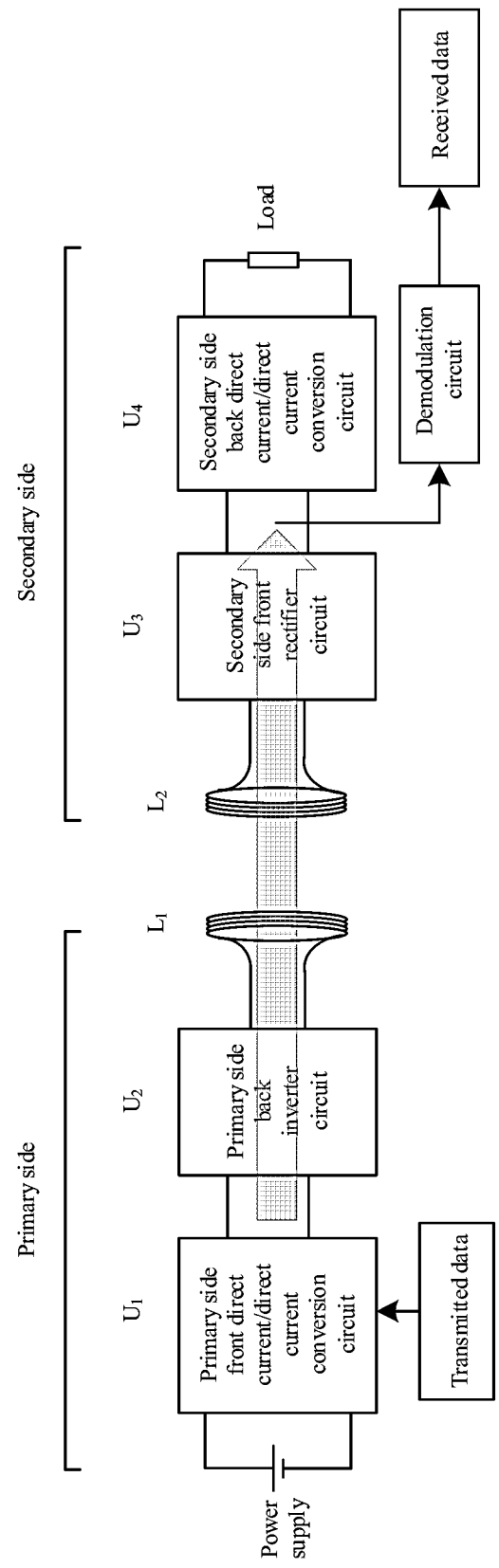
FIG. 2 is an architecture schematic diagram of a forward wireless energy and data synchronous transfer system.

As shown in FIG. 2, when the primary side sends data to the secondary side, the primary side front direct current/direct current conversion circuit $U_1$ adopts a power and information complex modulation method to superpose a data signal to a direct current output end; after secondary modulation by the primary side back inverter circuit $U_2$, a main frequency band of the data signal is moved to a frequency near an operating frequency of wireless power transfer, and the data signal is transmitted to the secondary side through the wireless power transfer coil accompanied by a power carrier in the wireless power transfer so as to demodulate an output voltage ripple or an output current ripple of the secondary side front rectifier circuit $U_3$, and the data sent by the primary side can be received.

Figure 3:
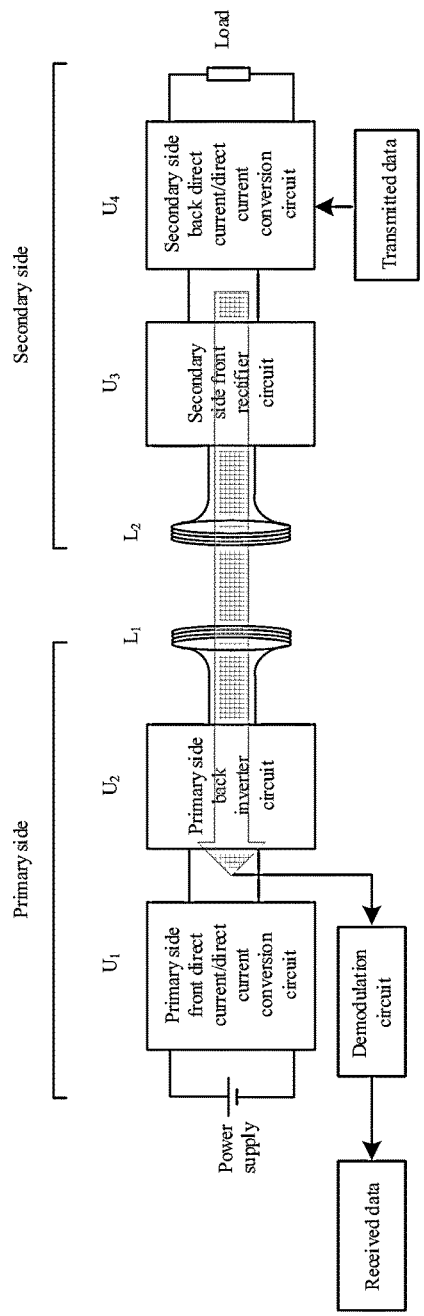
FIG. 3 is an architecture schematic diagram of a backward wireless energy and data synchronous transfer system.

As shown in FIG. 3, when the secondary side sends data to the primary side, the secondary side back direct current/direct current conversion circuit $U_4$ adopts the power and information complex modulation method to superpose a data signal to a direct current input end; after secondary modulation by the secondary side front rectifier circuit $U_3$, a main frequency band of the data signal is moved to a frequency near an operating frequency of wireless power transfer, and the data signal is transmitted to the primary side through a wireless power transfer coil so as to demodulate an output voltage ripple or an output current ripple of the primary side front direct current/direct current conversion circuit $U_1$, and the data sent by the secondary side can be received.

Figure 4:
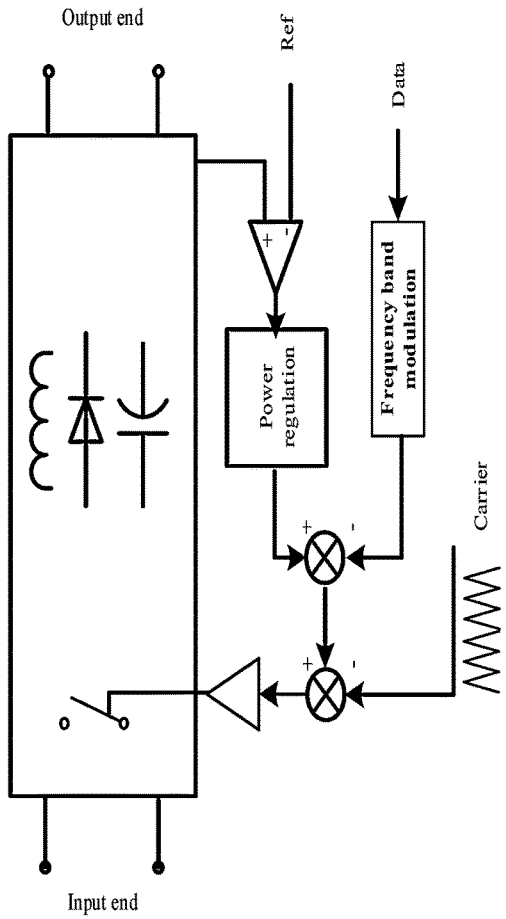
FIG. 4 is a schematic diagram of a principle of band modulation using the front converter and the back converter for data transfer.

The primary side front direct current/direct current conversion circuit U1 and the secondary side back direct current/direct current conversion circuit U4 adopts one of the following two manners to realize the power/information modulation:

① a frequency and phase of a pulse-width modulation carrier are fixed, and the data signal after a baseband or frequency band modulation is superposed to a power control loop of U1 or U4, as shown in FIG. 4.

Figure 5:
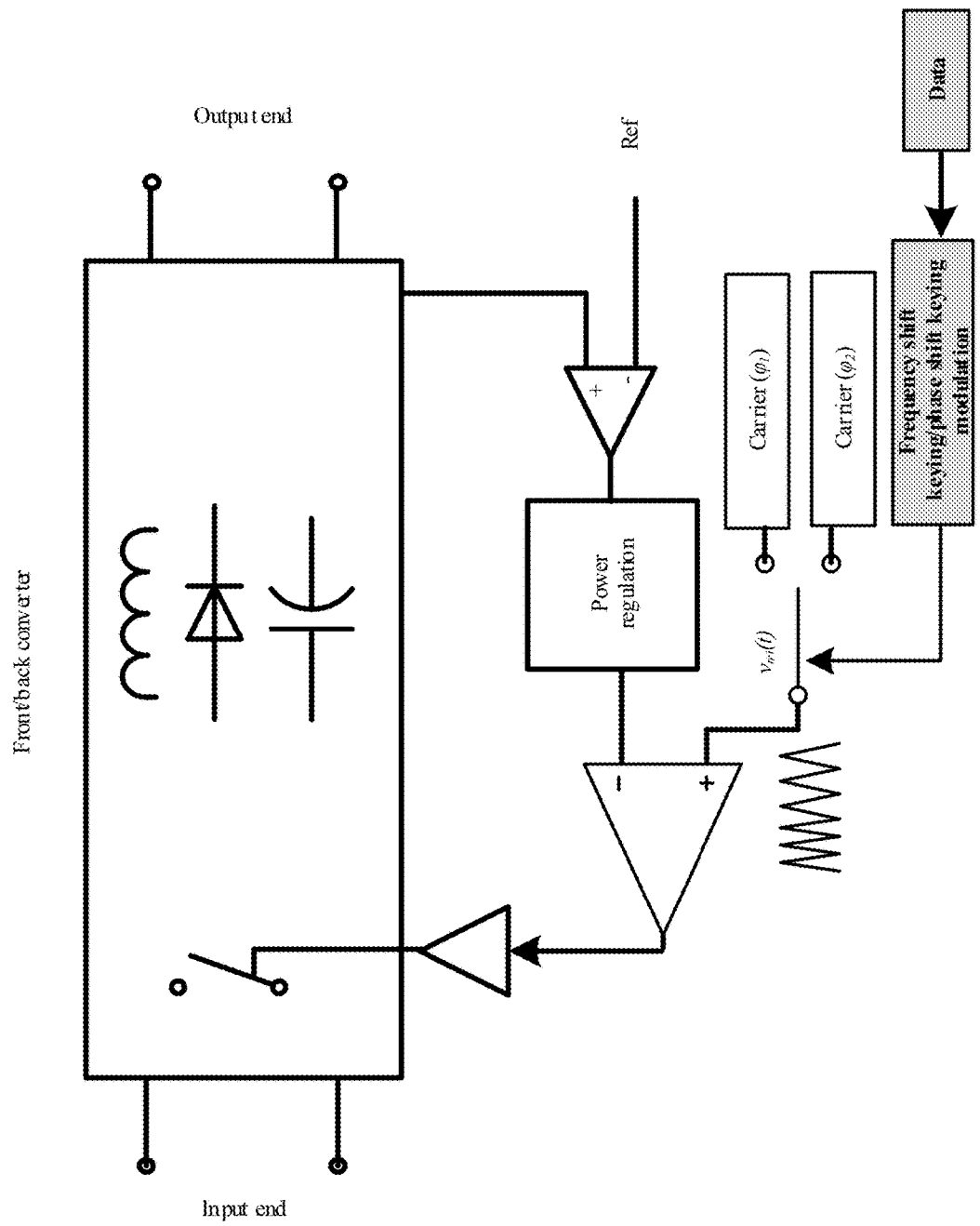
FIG. 5 is a schematic diagram of a principle of phase shift keying/frequency shift keying modulation using the front converter and the back converter for data transfer.

② the data is modulated in a U1 or U4 pulse-width modulation carrier, and a modulation method comprises frequency shift keying modulation or phase shift keying modulation of the carrier, as shown in FIG. 5.

In the following, we use FIG. 6 to illustrate similarities and differences between energy and information in the transfer process of wireless energy information synchronous transfer system. Input energy at ① is defined as $e_1$, and an input alternating current signal is defined as $v_1$. Since the input energy is an alternating current component, the input alternating current signal is a complex exponential signal, and $E_1 > |V_1|$, which is denoted as:

$$e_1 + v_1 = E_1 + V_1 \cos(\omega_1 t + \theta_1)$$

Figure 6:
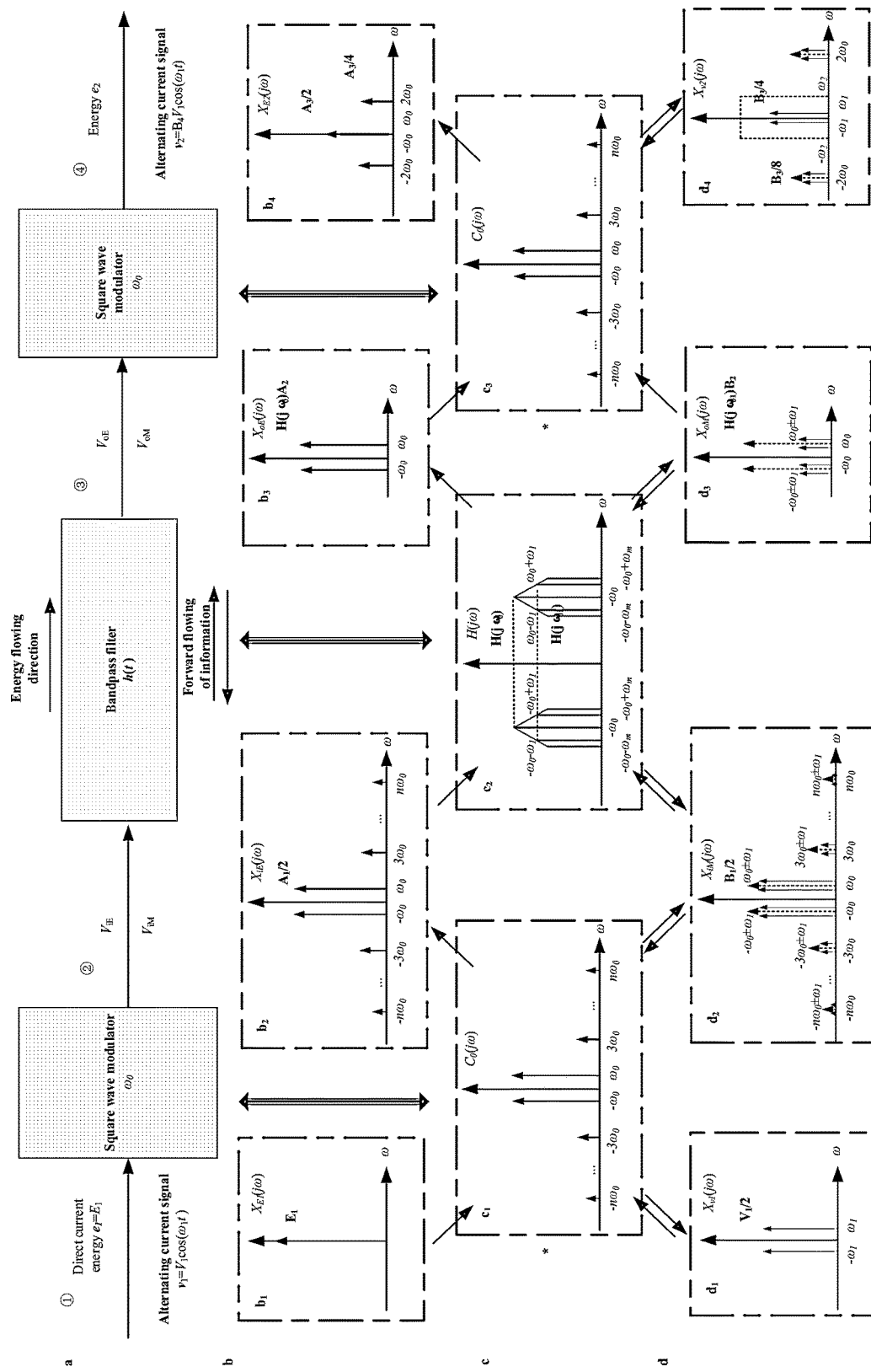
FIG. 6 is a schematic diagram of signal spectrum slices of a wireless information and energy fusion transfer system.

In a given spectrum diagram, $b_1$ and $d_1$ in FIG. 6 correspond to the energy and information signals in the above formula respectively. In order to simplify analysis, $\theta_1 = 0$.

A baseband signal given by a in FIG. 6 is a narrowband signal with a signal bandwidth of B, and the signal bandwidth meets $B << \omega_0/2\pi$ ($\omega_0$ is the carrier frequency), so an amplitude and a phase of the information are "slowly changing" time functions relative to the switching frequency $\omega_0$. Assuming that power electronic switches are consisted of ideal components, the inverter and rectifier can be regarded as square wave modulators (or sine wave modulators), and output voltage amplitudes of the modulators depend on input voltage amplitudes and a duty cycle of gate pulse-width modulation control signal, which is assumed to be 50%. Therefore, a Fourier expansion form of the output voltage of the modulators is denoted as:

$$U_0 = \sum_n \frac{4mU_0}{n\pi} \cos(n\omega_0 t),$$

$$m = \begin{cases} 1, & \text{Full-bridge } n = 1, 3, 5, \ldots \\ 0.5, & \text{Half-bridge } n = 1, 2, 3, \ldots \end{cases}$$

$c_1$ and $c_3$ in FIG. 6 show frequency domain models of the square wave modulators in the above formula (taking full-bridge inverters as an example). In spectrum components of the output voltage of each modulator, a fundamental wave component occupies a main component. In addition, the use of the frequency domain convolution theorem helps to explain a basic principle of modulation, for example, a narrowband signal spectrum is translated to $\omega_0$, it is only need to multiply the narrowband signal by a carrier signal $\cos(\omega_0 t)$, so time domain and frequency domain components of an output signal at ② can be denoted as:

$$\begin{cases} V_{iE} = A_1 \cos(\omega_0 t) \\ V_{iM} = B_1 \cos(\omega_1 t)\cos(\omega_0 t) \end{cases} \leftrightarrow \begin{cases} A_1 \delta(\omega \pm \omega_0)/2 \\ B_1 F(\omega \pm \omega_0)/2 \end{cases}$$

$b_2$ and $d_2$ in FIG. 6 correspond to spectrum slices of the above formula. The graph shows that both energy and information are moved to a frequency domain range centered on $\omega_0$, which is called a bandpass modulation signal in communication, and therefore a basis for propagation in a high-frequency channel is formed. In a wireless energy transfer model, an intermediate resonant cavity is usually consisted of capacitor and inductor in series or in parallel, with a function of frequency selection. It is mainly to improve a Q value of the system in a specific frequency band, so as to improve a distance and efficiency of the energy transfer. We abstract it as a linear phase bandpass filter of which a frequency graph slice is as shown in $c_2$ in FIG. 6. A filter system can process an input signal at ② to an output signal at ③, and its characteristics can be characterized by an impulse response h(t) or a Fourier transform $H(j\omega)$:

$$H(j\omega) = |H(j\omega)| e^{-j(\omega - \omega_0)\tau}$$

A bandwidth of the bandpass filter is $2\omega_m$ and the baseband signal satisfies $\omega_1 < \omega_m$, and a spectrum gain of the signal at $\omega_0 \pm \omega_1$ is denoted as $H_0(j\omega)$. Therefore, the bandpass propagation process can be expressed by a frequency domain product of the input signal and the filter. In other words, the input spectrum is modified or filtered, and an amplitude of the energy and information at ③ is denoted as:

$$V_{oE}+V_{oM}=(V_{iE}+V_{iM})*h(t) \leftrightarrow \mathcal{F} \; (V_{iE}+V_{iM})|H(j\omega)|=|H(j\omega_0)|A_2\delta(\omega\pm\omega_0)+|H(j\omega_{01})|B_2F(\omega\pm\omega_0)$$

After the bandpass modulated signal passes through the filter, the signal is as shown by $b_3$ and $d_3$ in FIG. 6. From a perspective of frequency domain, the bandpass filter filters out a very-high-frequency component, and retains a fundamental wave component and a signal component near it. Considering symmetry of the wireless power transfer system, the rectifier circuit can also be regarded as a square wave modulator similar to the inverter, and the difference from ① is that due to frequency selection characteristics of an ideal bandpass filter, the amplitude of energy and information can be expressed as:

$$e_2 + v_2 = (V_{oE} + V_{oM})\cos(\omega_0 t) \leftrightarrow$$

$$A_3\left[\frac{1}{2} + \frac{1}{4}\delta(\omega \pm 2\omega_0)\right] + B_3\left[\frac{1}{4}\delta(\omega \pm \omega_1) + \frac{1}{8}F(\omega \pm 2\omega_0)\right]$$

The corresponding spectrum outputs of $e_2$ and $v_2$ are as shown in $b_4$ and $d_4$ in FIG. 6, and recovery processes of the energy and information are different. Firstly, the energy recovery process is analyzed. An energy signal can be output, by connecting a suitable large capacitor in parallel through the rectifier, as a direct current signal to power the load, which is similar to a process of envelope detection. For a process of information demodulation, since there is no need to retain a component of double frequency thereof, a low-pass filter circuit ($\omega_1 < \omega_{m2} << \omega_0$) with a cutoff frequency of $\pm\omega_{m2}$ or a frequency-selecting network can be selected for filtering to recover the signal information, which is denoted as:

$$\begin{cases} e_2 = A_4 E_1 \\ v_2 = B_4 V_1 \cos(\omega_1 t - \varphi_1) \end{cases}$$

Embodiment 1

In this embodiment, "wireless energy and data synchronous transfer coils" mean that there is no electrical contact between a coil of a transmitting device and a coil of a receiving device, and the energy and data are transferred through only a magnetic field. Therefore, in addition to Mhz wireless charging in this embodiment, the wireless energy and data synchronous transfer method proposed in the present invention can also be realized at other frequencies.

Figure 7:
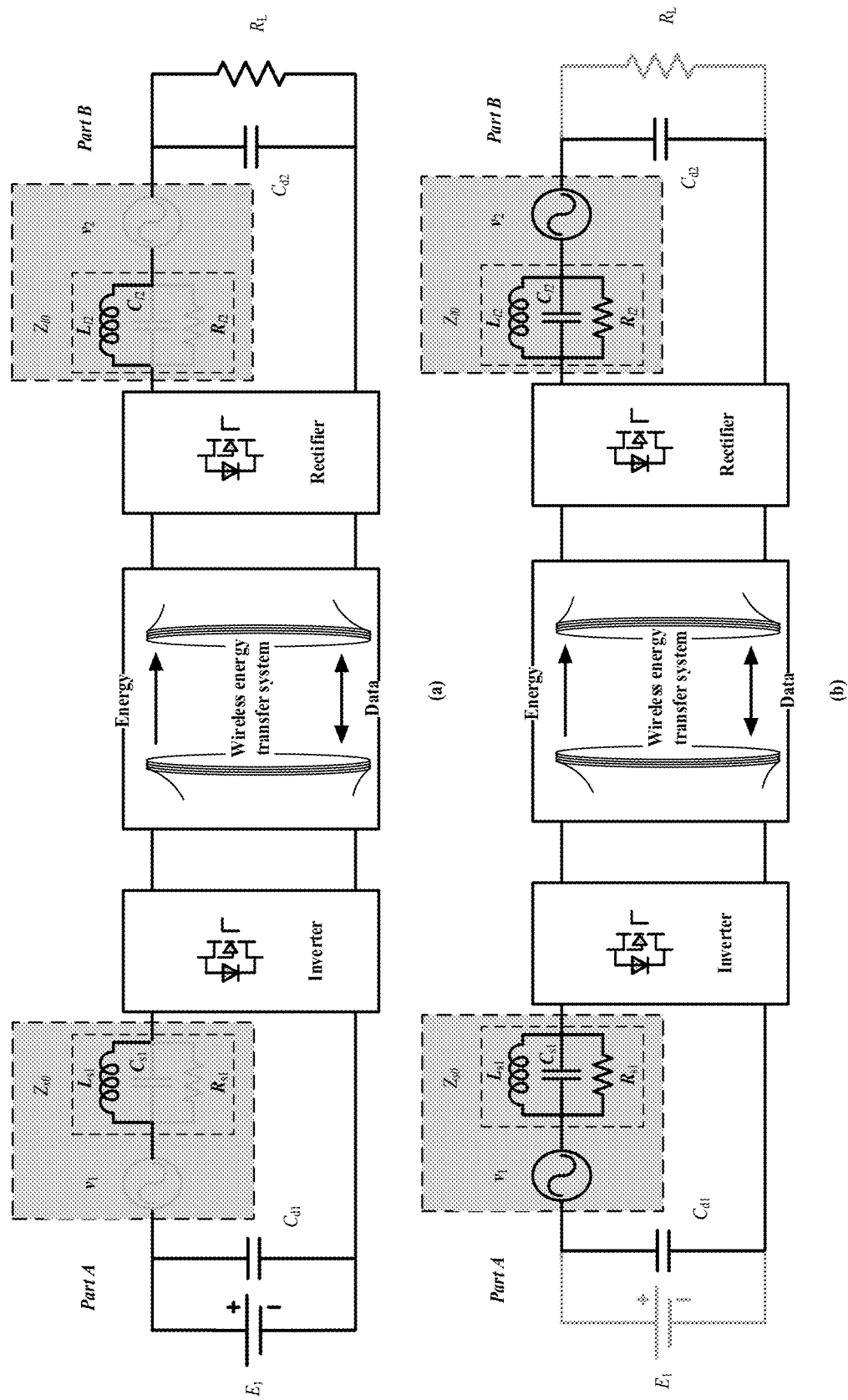
FIG. 7($a$) is a schematic diagram of a principle of wireless energy transfer based on the energy and data synchronous transfer system.

From a view of a circuit structure, the processes of wireless energy transfer and wireless information transfer are very similar. FIG. 7(a) shows an embodiment of the wireless energy transfer method, and FIG. 7(b) shows an embodiment of the wireless information transfer method.

(1) direct current energy forms an energy transfer loop through a filter circuit, an inverter, a wireless energy and data synchronous transfer coil, a rectifier, an output filtering system and load.

In FIG. 7(a), one end of direct current energy $E_1$ is connected in parallel with a voltage regulating capacitor $C_{d1}$ and in series with an inductor $L_{s1}$ and an input end of the inverter, and the other end is connected in parallel with the voltage regulating capacitor $C_{d1}$ and the other end of the input of the inverter to form a direct current energy loop. One end of an output of the inverter is connected to one end of the wireless energy transfer system, and an energy emitting pole loop is formed by a transmitting side coil consisted of series and parallel connected compensation circuits and the other end of the output of the inverter. One end of a receiving side induction coil is connected to an input end of the rectifier through a series and parallel connected compensation circuits, and the other end of the induction coil is connected to the other end of the input of the rectifier to form an energy receiving pole loop. One end of the output side of rectifier is connected in series with an inductor $L_{s2}$ and in parallel with a capacitor $C_{d2}$ and one end of a load $R_L$, and the other end of the rectifier is connected in parallel with a capacitor and the other end of the load to form a direct current energy supply loop.

(2) In a forward information transfer process, an information source forms a forward information transfer loop through the series connected inverter of a digital demodulation network consisted of the frequency-selecting network, the wireless energy and data synchronous transfer coil system, the rectifier and the information demodulation circuit consisted of the digital frequency-selecting network.

In FIG. 7(b), one end of an information source $v_1$ is connected in series with the capacitor $C_{d1}$ and one end of an input side of the inverter, and the other end is connected in series with a set of frequency-selecting network $Z_{s0}$ based on parallel connected RLC and the inverter, so as to form an information loading loop. One end of the output of the inverter is connected to one end of the wireless information transfer system, and the transmitting side coil consisted of series and parallel connections and the other end of the output of the inverter form the information emitting pole loop. One end of the receiving side induction coil is connected to an input end of the rectifier through a series and parallel connected compensation circuit, and the other end of the induction coil is connected to the other end of the input of the rectifier to form an information receiving pole loop. One end of the output of the rectifier is connected in series with a set of parallel connected frequency-selecting networks $Z_{t0}$ and is connected in series with the capacitor $C_{d2}$, and the other end is connected in series with the capacitor $C_{d2}$ to form an information recovery path. By detecting a voltage on $R_2$, an information signal in $v_1$ can be recovered through a digital demodulation circuit.

(3) In a backward information transfer process, an information source forms a backward information transfer loop through the series connected rectifier of a digital demodulation network consisted of the frequency-selecting network, the wireless energy and data synchronous transfer coil, the inverter and the information demodulation circuit consisted of the digital frequency-selecting network.

In FIG. 7(b), one end of an information source $v_2$ is connected in series with the capacitor $C_{d2}$ and one end of an output side of the rectifier, and the other end is connected in series with a set of frequency-selecting network $Z_{t0}$ based on parallel connected RLC and the rectifier, so as to form an information loading loop. One end of the input of the rectifier is connected to one end of the wireless information transfer system, and the transmitting side coil consisted of series and parallel connections and the other end of the output of the inverter form the information emitting pole loop. One end of the receiving side induction coil is connected to an output end of the inverter through a series and parallel connected compensation circuit, and the other end of the induction coil is connected to the other end of the output of the inverter to form an information receiving pole loop. One end of the input of the inverter is connected in series with a set of frequency-selecting networks $Z_{s0}$ based on parallel connected RLC and the capacitor $C_{d1}$, and the other end is connected in series with the capacitor $C_{d1}$ to form an information recovery path. By detecting a voltage on $R_1$, an information signal in $v_2$ can be recovered through a digital demodulation circuit.

The resonance wireless energy and data synchronous transfer system in this embodiment comprises a direct current power supply, a high-frequency inverter, an information receiving and demodulation circuit, a charging induction coil and a compensating capacitor, a rectifier, a direct current conversion circuit, and a load.

The high-frequency inverter outputs the input energy of the direct current power supply as a high-frequency alternating current power supply, transmits high-frequency alternating current power through the resonant/coupling of transmitting and receiving induction coils, and supplies power to the load through the rectifier and the direct current conversion circuit. The transferred information is loaded into the direct current energy before and after the inverter or rectifier through the power electronic switch, which is first modulated into a high-frequency alternating current signal by the inverter/rectifier, then passes through an energy and data synchronous transfer channel, and finally passes through the rectifier/inverter at a receiving side for demodulation to restore to a low-frequency band, and finally passes through a digital receiving and demodulation circuit to restore to a digital signal.

Embodiment 2

Figure 8:
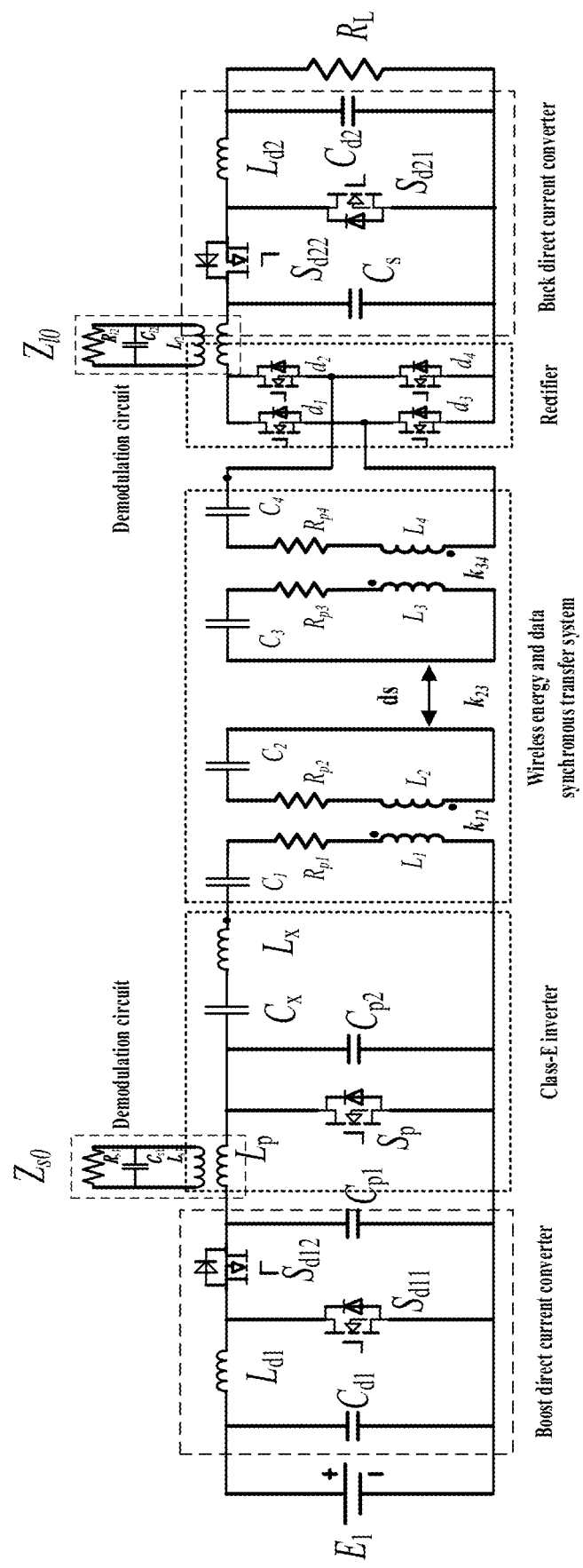
FIG. 8 is an example diagram of a wireless energy and data synchronous transfer system based on ripple modulation of a current converter.

FIG. 8 shows an example of a wireless energy and data synchronous transfer system based on converter ripple modulation. The system comprises: a direct current power supply, a Boost direct current converter, an emitting pole demodulation circuit, a Class-E inverter, a wireless charging resonant cavity, a rectifier, a receiving demodulation circuit, a buck direct current converter, and a load.

In this example, a working principle of the synchronous transfer of energy and data is as follows: the Boost/Buck direct current converter regulates the direct current power supply/a receiving side input direct current voltage to an appropriate supply voltage so as to ensure that the system works at an optimal efficiency point. The information is in disturbance through a duty cycle or a frequency; a low-frequency signal (1k~200k) is injected into a direct current energy path. The signal is modulated to a high-frequency carrier band through the inverter/rectifier, and passes through a wireless energy and data transfer coil (channel) with a bandpass function, and then passes through the rectifier/inverter so as to be demodulated to a low-frequency analog signal, and finally passes through a sampling and digital demodulation module to be restored to a digital signal.

The energy and data transmitting unit comprises a direct current power supply, a Boost direct current conversion circuit, a Class-E inverter and a transmitting coil charging loop. The energy and data receiving unit comprises a receiving coil charging loop, a rectifier, a Buck direct current conversion circuit and a direct current load. The wireless energy and data synchronous transfer coil comprises a transmitting side excitation coil with a self-inductance parameter $L_1$ and a resistance parameter $R_{p1}$; a transmitting side coil $L_2$ with a resistance parameter $R_{p2}$; a receiving side coil $L_3$ with a resistance parameter $R_{p3}$; a load coil with a self-inductance parameter $L_4$ and a resistance parameter $R_{p4}$. Mutual inductance coupling coefficient parameters between resonant coils are $k_{12}$, $k_{23}$, $k_{34}$. Mutual inductance $M_{12}$, $M_{23}$, $M_{34}$ between coils are determined by the following formula:

$$\begin{cases} M_{12} = k_{12}\sqrt{L_1 L_2} \\ M_{23} = k_{23}\sqrt{L_2 L_3} \\ M_{34} = k_{34}\sqrt{L_3 L_4} \end{cases}$$

In this example, the wireless field is of "a near field" and "a middle-far distance", and the near field exists in an electromagnetic field region excited by the excitation and emission coil, so as to transfer the energy and the data, and its corresponding wavelength is about one wavelength or in a fraction range. The middle-far distance is different from a few millimeters or tens of centimeters used in electric vehicle and consumer electronics use scenarios, which should reach the distance in this example (more than one meter), and through appropriate adjustment, it is also suitable for wireless charging of a few millimeters or tens of centimeters.

The resonance coil is connected in series with a resonance capacitor $C_1$, $C_2$, $C_3$, $C_4$, or is obtained by a self-resonant design of the coil. Although the current resonance wireless charging method mostly chooses a self-resonant mode, it is easy to cause impossibility of mass production, and a large-scale production method can be a PCB design or a skeleton design. Compensation resonance capacitance parameters are determined by the following formula:

$$C_i = \frac{1}{\omega_0^2 L_i} (i = 1, 2, 3, 4)$$

wherein $\omega_0$ is a resonant angular frequency of the wireless energy transfer system, which is usually 6.78 Mhz or 13.56 Mhz.

The Class-E inverter circuit comprises a filter inductor $L_x$, a filter capacitor $C_x$, a power electronic switch $L_p$, a switch capacitor $C_{p2}$ and a choke inductor $L_p$. The inverter can be replaced by a direct current-alternating current square wave inverter such as a half-bridge or a full-bridge, and a compensation capacitance parameter of $C_x$ is determined by the following formula:

$$C_x = \frac{1}{\omega_0^2 L_x}$$

In an energy transfer mode, the inverter circuit converts direct current energy into a high-frequency alternating current square wave, which is output through the inverter to the excitation coil. In a wireless communication mode, a low-frequency communication signal is loaded to a carrier band near the high-frequency carrier band by the inverter. The principle is similar to that of a mixer, so the inverter functions as a square-wave modulation circuit or a sine wave modulation circuit.

The digital demodulation circuit comprises transformer circuits $L_{s1}$, $L_{12}$, parallel connected frequency-selecting capacitor $C_{s1}$, $C_{12}$ and receiving resistors $R_{s1}$, $R_{f1}$. In addition to this example, other filter circuits can be selected as receiving circuits. Due to existence of power electronic switching ripple and inverter harmonic interference in the receiving loop, it is necessary to filter them out through the frequency-selecting network, while avoiding the frequency-selecting network to interfere with the power circuit. The frequency-selecting capacitance and resistance parameters are determined by the following formulas:

$$\begin{cases} C_{s1} = \dfrac{1}{\omega_1^2 L_{s1}} \\ C_{f1} = \dfrac{1}{\omega_1^2 L_{f1}} \\ R_{s1} = Q_1 \sqrt{\dfrac{L_{s1}}{C_{s1}}} \\ R_{f1} = Q_2 \sqrt{\dfrac{L_{f1}}{C_{f1}}} \end{cases}$$

In the formulas: $\omega_1$ is a cutoff frequency resonance angular frequency of the frequency-selecting network; $Q_1$ and $Q_2$ are quality factors of the frequency-selecting network, which are generally within 10; the Q value is different from the Q value of the wireless transfer system coil; the Q value of the demodulation receiving device is to adjust a gain of the receiving circuit signal, and is generally small; and the transmitting and receiving coils are to improve a gain of the power circuit, and are generally large. It is needed to distinguish them.

The rectifier comprises Schottky diodes $d_1$~$d_4$; load equivalent internal resistance $R_L$ adopts a battery load; and the rectifier can also be replaced by the Class-E rectifier, the half-bridge, the full-wave rectifier circuit. The Boost direct current converter circuit comprises an energy storage inductor $L_{d1}$, filter capacitors $C_{d1}$, $C_{p1}$ and power electronic switches $S_{d11}$, $S_{d12}$. The Buck direct current converter circuit comprises a filter inductor $L_{d2}$, filter capacitors $C_{d2}$, $C_s$ and power electronic switches $S_{d21}$, $S_{d22}$.

The above direct current conversion circuit can also be replaced by other suitable circuits, such as Buck-Boost, Cuk. In the process of energy transfer, the direct current conversion circuit functions as a power regulator, plays the role of regulating the maximum power tracking and energy supply at the transmitting side, and plays the role of maintaining constant load power or constant voltage and current at the receiving side, so as to play the role of battery management. In the process of information transfer, through the duty cycle disturbance or frequency disturbance of the power electronic switch, it acts as the information source, and realizes the synchronous transfer function of the energy and data through the direct current conversion circuit.

The above description of embodiments is intended to facilitate the understanding and application of the present invention by an ordinary person skilled in the art. A person skilled in the art can obviously easily make various modifications to the above embodiments and apply general principles described herein to other embodiments without a creative effort. Therefore, the present invention is not limited to the above embodiments, and improvements and modifications of the present invention made by a person skilled in the art according to the disclosure of the present invention shall be within the protection scope of the present invention.

The invention claimed is:

1. A wireless power and data synchronous transfer system, comprising two parts: a primary side part and a secondary side part, wherein the primary side part comprises a direct current power supply, a filter capacitor, a primary side front direct current/direct current conversion circuit U1, a primary side demodulation circuit, a primary side back inverter circuit U2 and a primary side coil L1 which are sequentially connected; and the secondary side part comprises a secondary side coil L2, a secondary side front rectifier circuit U3, a secondary side demodulation circuit, a secondary side back direct current/direct current conversion circuit U4, a filter capacitor and a load which are sequentially connected; the primary side part and the secondary side part are coupled by the primary side coil L1 and the secondary side coil L2 to realize wireless synchronous transfer of power and data;
wherein the primary side sends data to the secondary side through a data modulation method of the system as follows:
the primary side front direct current/direct current conversion circuit U1 using a power and information complex modulation method to superpose a data signal to a direct current output end of U1, wherein the power and information complex modulation method used by the primary side front direct current/direct current conversion circuit U1 is realized in one of the following two manners:
manner 1: a frequency and phase of a pulse-width modulation carrier are fixed, a baseband or frequency band modulation to the data signal is conducted, and the data signal after the baseband or frequency band modulation is superposed to a power control loop of U1; or
manner 2: the data is modulated in a U1 pulse-width modulation carrier, and a carrier modulation method thereof is frequency shift keying or phase shift keying;
the primary side back inverter circuit U2 conducting a secondary modulation of the data signal, wherein the secondary modulation is a mixing modulation process, that is, a high-frequency switching process of the primary side back inverter circuit U2 is equivalent to a process of performing a square wave modulation of a low-frequency data signal on a direct current side, and moving the low-frequency data signal to a frequency near operating frequencies of the coils in a frequency domain;
moving a main frequency band of the data signal to a frequency near an operating frequency of wireless power transfer, and then transmitting the data signal to the secondary side through the primary side coil L1 and the secondary side coil L2 accompanied by a power carrier in the wireless power transfer;
the secondary side demodulation circuit conducting signal demodulation of an output voltage ripple or an output current ripple of the secondary side front rectifier circuit U3;
receiving the data sent by the primary side; and
wherein the secondary side sends data to the primary side through a data modulation method of the system as follows:
the secondary side back direct current/direct current conversion circuit U4 using the power and information complex modulation method to superpose a data signal to a direct current input end of U4, wherein the power and information complex modulation method operated by the secondary side back direct current/direct current conversion circuit U4 is realized in one of the following two manners:
manner 1: a frequency and phase of a pulse-width modulation carrier are fixed, a baseband or frequency band modulation to the data signal is conducted, and the data signal after the baseband or frequency band modulation is superposed to a power control loop of U4; or manner 2: the data is modulated in a U4 pulse-width modulation carrier, and a carrier modulation method thereof is frequency shift keying or phase shift keying;

the secondary side front rectifier circuit U3 conducting a secondary modulation of the data signal, wherein the secondary modulation is a mixing modulation process, that is, a high-frequency switching process of the secondary side front rectifier circuit U3 is equivalent to a process of performing a square wave modulation of a low-frequency data signal on a direct current side, and moving the low-frequency data signal to a frequency near operating frequencies of the coils in a frequency domain;

moving a main frequency band of the data signal to a frequency near an operating frequency of wireless power transfer, and then transmitting the data signal to the primary side through the secondary side coil L2 and the primary side coil L1;

the primary side demodulation circuit conducting signal demodulation of an output voltage ripple or an output current ripple of the primary side front direct current/direct current conversion circuit U1;

receiving the data sent by the secondary side.

2. The wireless power and data synchronous transfer system according to claim 1, wherein the primary side front direct current/direct current conversion circuit U1 and the secondary side back direct current/direct current conversion circuit U4 comprises a circuit topological structure of a Buck, a Boost, a Buck-Boost, an inductor-inductor-capacitor, a half-bridge, or a full-bridge.

3. The wireless power and data synchronous transfer system according to claim 1, wherein the primary side back inverter circuit U2 comprises a circuit topological structure of a full-bridge inverter, a half-bridge inverter, or a Class-E inverter; and the secondary side front rectifier circuit U3 comprises a circuit topological structure of a full-bridge rectifier, a half-bridge rectifier, or a Class-E rectifier.

4. The wireless power and data synchronous transfer system according to claim 1, wherein the system has an operating frequency from 1 kHz to 100 MHz.

* * * * *